United States Patent [19]

Pyles

[11] 4,283,833
[45] Aug. 18, 1981

[54] METHOD OF ATTACHING A BALL JOINT TO A SUSPENSION MEMBER

[75] Inventor: Eliot T. Pyles, South Bend, Ind.

[73] Assignee: The Bendix Corporation, Southfield, Mich.

[21] Appl. No.: 21,038

[22] Filed: Mar. 16, 1979

[51] Int. Cl.³ .............................................. B23P 11/00
[52] U.S. Cl. .................................. 29/441 R; 29/445;
228/155; 403/140
[58] Field of Search .............. 29/149.5 B, 441 R, 445;
403/122, 135–140; 228/155

[56] References Cited

U.S. PATENT DOCUMENTS

| | | | |
|---|---|---|---|
| 1,943,631 | 1/1934 | Skillman | 29/149.5 B |
| 2,936,188 | 5/1960 | Moskovitz | 403/139 |
| 3,129,023 | 4/1964 | Fierstine | 403/122 |
| 3,305,617 | 2/1967 | Dumpis | 29/149.5 B X |
| 3,342,513 | 9/1967 | Melton et al. | 403/135 X |
| 3,711,121 | 1/1973 | Molby | 403/140 X |

Primary Examiner—Charlie T. Moon
Attorney, Agent, or Firm—Paul David Schoenle; Ken C. Decker; Terry L. Miller

[57] ABSTRACT

A suspension member is pivotally secured to a vehicle frame at one end and is connected with a wheel assembly at the other end. In order to connect the wheel assembly to the suspension member, at least one ball joint is fixed to the suspension member for releasably engaging the wheel assembly. The ball joint includes a socket, a bearing and a stud. The socket defines a cavity for receiving the bearing and the stud extends radially outwardly from the socket. Before the ball joint is assembled, the socket is welded to the suspension member. Next, the socket is machined to define a contoured surface within the cavity which mates with the bearing as the bearing and stud are disposed within the socket cavity. Finally, the socket is deformed to trap the bearing and stud within the cavity.

5 Claims, 5 Drawing Figures

METHOD OF ATTACHING A BALL JOINT TO A SUSPENSION MEMBER

BACKGROUND OF THE INVENTION

A suspension member is provided to form a connection between a vehicle frame and a wheel assembly. A pair of ball joints are carried by the suspension member to secure the wheel assembly thereto. The ball joints are assembled as a unitary structure prior to attachment to the suspension member. A socket of each ball joint is provided with a cavity to receive a bearing and a stud and the socket is deformed to prevent separation between the socket, bearing and stud, thereby defining the unitary structure.

The suspension member is provided with an opening for receiving a bushing which is welded to the suspension member. The bushing defines a bore and the ball joint of unitary construction is press fitted within the bushing bore. A snap ring is often carried by the ball joint to oppose the bushing, thereby preventing separation between the bushing and ball joint should the press fit therebetween be weakened.

SUMMARY OF THE INVENTION

The present invention relates to an improved method of attaching a ball joint to a suspension member. In particular, the improved method eliminates a bushing and snap ring which were used heretofore and avoids the step wherein the ball joint is press fitted into the bushing. In addition, the improved method provides for machining of a socket of the ball joint after the socket is permanently fixed to the suspension member. The socket is machined after it is permanently fixed to the suspension member to provide a contoured surface in a cavity for receiving a bearing and stud of the ball joint.

The suspension member is provided with an opening and the socket is inserted into the opening until a flange on the socket abuts one side of the suspension member. The socket is then welded to the suspension member on the other side. Next, a tool is engageable with the socket to generate a contoured surface within a cavity to enable the bearing and stud to fit within the cavity. The socket is subsequently deformed to prevent separation between the socket, bearing and stud.

It is a primary object of the present invention to attach a ball joint to a suspension member such that the ball joint is formed on the suspension after a portion of the ball joint is fixed to the suspension member.

It is another object of the present invention to attach a ball joint to a suspension member in the absence of a press fit and to eliminate a bushing and snap ring.

DETAILED DESCRIPTION

Figure 5:
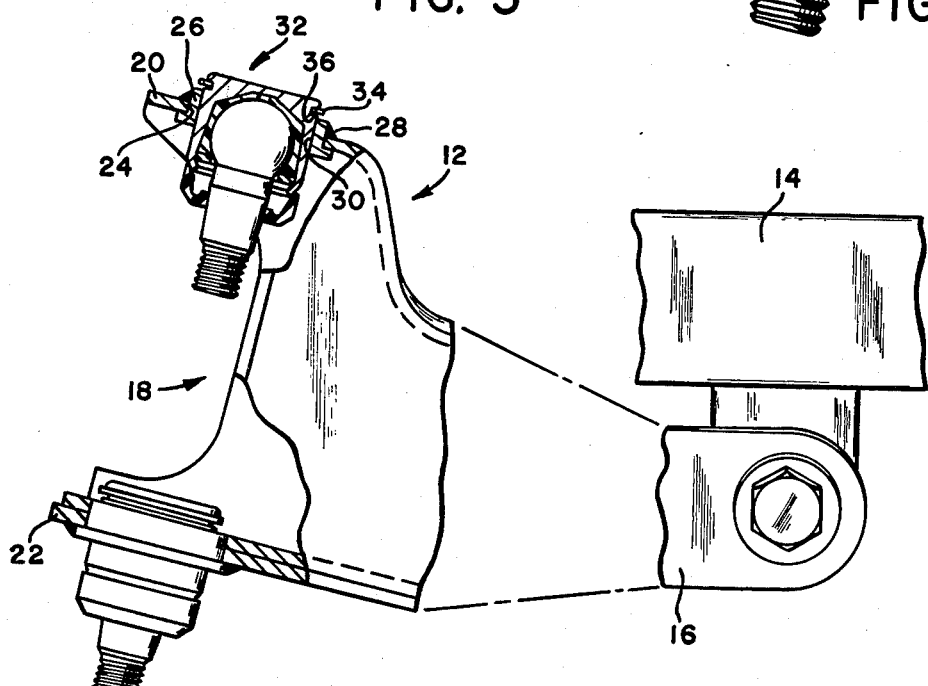
FIG. 5 shows a view of the prior art ball joint and suspension member.

Turning to the prior art shown in FIG. 5, a suspension member 12 is pivotally coupled to a vehicle frame 14 at one end 16 while the other end 18 is bifurcated to define a top arm 20 and a bottom arm 22. As the top arm 20 is substantially identical to the bottom arm 22 the following description with reference to the top arm is equally applicable to the bottom arm.

The top arm 20 defines an opening 24 within which is disposed a bushing 26. The bushing is welded at 28 to the top arm 20 and a bore 30 receives a unitary ball joint 32 which is press fitted into the bushing bore 30. Thereafter, a snap ring 34 is disposed within a recess 36 on the ball joint to prevent separation between the ball joint 32 and the top arm 20.

Figure 1:
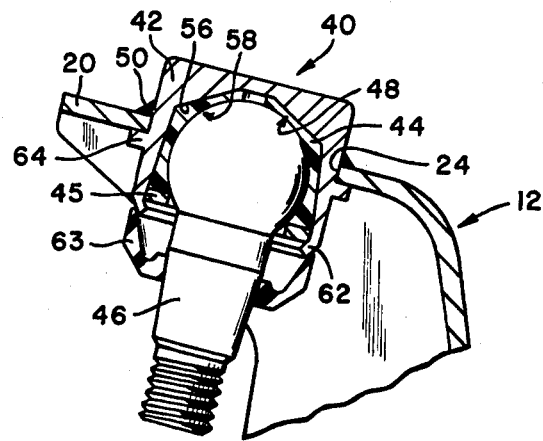
FIG. 1 is a partial cross-sectional view of a suspension member having a ball joint attached thereto in the manner of the present invention.

In FIG. 1 the top arm 20 of suspension member 12 forms the opening 24 and a ball joint 40 is disposed within the opening 24. The ball joint 40 comprises a socket 42, a bearing 44 and a stud 46. The bearing 44 is carried within a cavity 48 to rotatably support the stud 46 and the stud extends outwardly of the socket for the purpose of coupling to a wheel assembly (not shown). The socket 42 is welded to the top arm 20 at 50.

Figure 2:
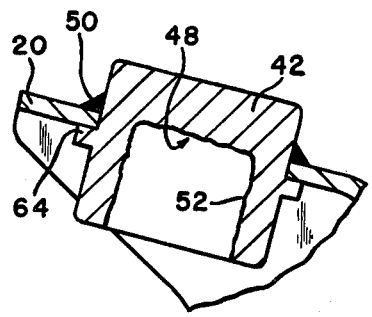
FIGS. 2-4 show the method used by the present invention to attach the ball joint to the suspension member.
Figure 3:
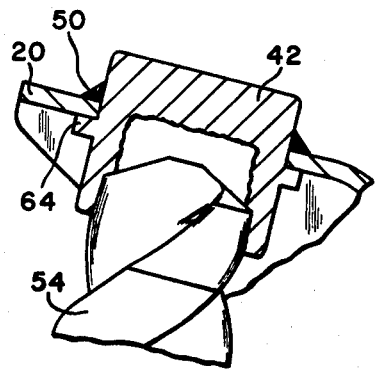
Figure 4:
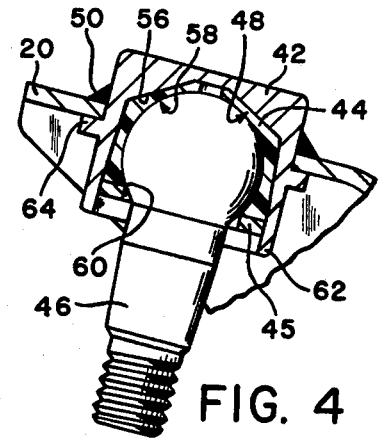

In accordance with the invention, the socket 42 of FIG. 2 is welded at 50 to the top arm 20. At this time the socket 42 is either provided with a rough surface 52 within cavity 48 or it is possible to completely eliminate the cavity 48. At FIG. 3, a tool 54 of suitable construction is advanced into engagement with the socket 42 which is permanently welded to the top arm 20. The tool is constructed to machine the rough surface 52 to result in a contoured surface 56 which mates with the outer surface of bearing 44. The bearing 44 defines a pocket 58 leading to an opening 60. As the bearing is made from a flexible material, it is possible to expand the opening 60 to permit the spherical portion of stud 46 to be inserted into the pocket 58. Generally, the stud 46 will be inserted into the bearing pocket 58 before the bearing is inserted into the pocket cavity 48. Although the bearing is shown as a one-piece part, it is also possible to use a two-piece bearing as is well known in the art. After the socket 42 is machined to form the contoured surface 66, the bearing with its attached stud is inserted into the socket cavity 48 to fully engage the bearing with the contoured surface 56. Thereafter, an optional ring 45 is positioned in abutment with the bearing 44 adjacent an outwardly extending boss 62. The boss is deformed as shown in FIG. 1, by any suitable method to overlap the ring 45 to prevent separation between the socket, bearing, and stud.

A flange 64 on the socket 42 opposes the top arm 20 on one side so that the top arm is maintained between the flange and the weld at 50. The flange also abuts the arm 20 to oppose the forces generated by the tool 54 when the latter is urged against the socket to form the contoured surface 56.

In a similar manner a ball joint may be constructed on and attached to the bottom arm 22. The present invention provides for the construction of a ball joint on the suspension member by welding a socket to the suspension member before the socket is machined to receive a bearing and stud. Moreover, no snap ring or bushing is required to attach the ball joint to the suspension member. Because the bearing is usually made from a thermoplastic material, the welding of the socket to the suspension member prior to the insertion of the bearing into the cavity 48 will prevent the thermoplastic bearing from coming in contact with the heat generated during welding. Moreover, the contoured surface 56 is formed after welding so that the heat generated during welding will not affect nor reshape the contoured surface.

The particular structure for the ball joint 40 is not a part of this invention. The ball joint need only include a socket which is welded to a suspension member prior to complete assembly of the ball joint.

I claim:

1. A method of attaching a ball joint assembly to a suspension member for connecting a wheel assembly to a vehicle frame, the ball joint assembly including a socket for receiving a bearing and a stud, said method comprising the steps of:

providing an opening on said suspension member;
inserting said socket into said opening;
welding said socket to said suspension member to fixedly position said socket within said opening;
machining said socket after said socket is welded to said suspension member to provide a cavity within said socket to receive said bearing and to further provide a contoured surface on said cavity engageable with said bearing; and
mounting said bearing and said stud within said cavity of said socket after the latter is welded to said suspension member and machined to provide said contoured surface.

2. The method of claim 1 in which said suspension member acts as a fixture for holding said socket during the machining of the latter.

3. The method of claim 2 in which said socket is provided with a flange opposing one side of said suspension member and said socket is welded to said suspension member on the other side thereof.

4. The method of attaching a ball joint assembly to a suspension member for connecting a wheel assembly to a vehicle frame wherein the ball joint assembly includes a socket providing a cavity therein, a bearing received within said cavity, and a stud coupled to the bearing, said method comprising the steps of:

providing an opening on said suspension member;
inserting said socket into said opening to abut a first portion of said socket with said suspension member and to extend a second portion of said socket outwardly from said opening;
welding said second portion of said socket to said suspension member to permanently fix said socket to said suspension member;
engaging a tool with said socket to generate a contoured surface within said cavity on said socket after said socket is welded to said suspension member, said contoured surface having a predetermined shape which substantially matches the outer surface of said bearing;
inserting said bearing and said stud which is coupled thereto into said cavity to engage said bearing outer surface with said contoured surface; and
deforming said socket to prevent separation between said bearing and said socket, thereby forming said ball joint assembly on said suspension member.

5. The method of claim 4 in which said first portion comprises a radially outwardly extending flange which is disposed in abutment with one side of said suspension member and said tool is advanced into engagement with said socket from the one side of said suspension member.

* * * * *